(12) United States Patent
Hsiao et al.

(10) Patent No.: US 6,426,823 B1
(45) Date of Patent: Jul. 30, 2002

(54) VIBRATION-PROOF DEVICE FOR OPTIC SOURCE ELEMENT OF UPPER TRANSPARENCY ADAPTER

(75) Inventors: Chun-I Hsiao; Chi-Chih Tseng, both of Hsinchu (TW)

(73) Assignee: Umaxdata Systems, Inc., Hsinchu (TW)

( * ) Notice: Subject to any disclaimer, the term of this patent is extended or adjusted under 35 U.S.C. 154(b) by 15 days.

(21) Appl. No.: 09/757,637

(22) Filed: Jan. 11, 2001

(51) Int. Cl.7 .............................................. G02B 26/08
(52) U.S. Cl. ...................... 359/196; 359/896; 358/474; 358/494; 358/506; 358/487
(58) Field of Search ................ 359/196–198, 359/896; 358/474, 487, 494, 496, 497, 505, 506, 509, 475; 399/211, 220, 118; 355/67

(56) References Cited

U.S. PATENT DOCUMENTS 5,986,774 A * 11/1999 Han ............................ 358/487
6,229,636 B1 * 5/2001 Sheng ......................... 359/196

* cited by examiner

Primary Examiner—James Phan
(74) Attorney, Agent, or Firm—Shoemaker and Mattare

(57) ABSTRACT

A vibration-proof device for an upper transparency adapter (UTA) of a scanner is provided. The vibration-proof device includes a supporter for coupling a slide rod mounted in a cover of the upper transparency adapter for an optic source carriage to be slidably coupled thereto, a positioning member for retaining in place the supporter in the cover and an elastic member interposed between the supporter and a base of the cover for providing the supporter with an upward elastic force so as to resiliently abut the optic source carriage against a glass panel attached to the cover.

7 Claims, 5 Drawing Sheets

VIBRATION-PROOF DEVICE FOR OPTIC SOURCE ELEMENT OF UPPER TRANSPARENCY ADAPTER

FIELD OF THE INVENTION

The present invention relates to a vibration-proof device for an optic source element of upper transparency adapter, and particularly to a vibration-proof device used in a scanner having an upper transparency adapter (UTA) for preventing noises caused by the optic source element of the UTA.

BACKGROUND OF THE INVENTION

FIG. 1 is a lateral view of a conventional scanner equipped with an UTA, in which the scanner mainly includes a casing 200 having a top being installed with a glass panel 45. A chassis 60 is installed within the casing 200. The chassis 60 is movably coupled to a slide lever 70 disposed inside the casing 200 for moving forwards and backwards along the slide lever 70 under the glass panel 45. An image sensing device (not shown) retained in the chassis 60 serves to scan a document 50 disposed over the glass panel 45. The image sensing device is generally equipped with a an image detector such as CCD, CIS or CMOS (compensated metal oxide semiconductor).

As illustrated in FIG. 1, an upper transparency adapter (UTA) is formed by a cover 100 attached to the top of the casing 200 and an optic source clement 10 mounted in the cover 100. The optic source element 10 is movably coupled to a slide lever 20 disposed in the cover 100 for moving synchronously with the chassis 60, and serves as a light source as the document 50 positioned over the glass panel 45 is transparent, in order for the image sensing device to sense the image on the document 50. As shown in the drawing, the optic source element 10 consists of a sliding carriage 14 and a light source 12 associated with the sliding carriage 14 for illuminating the document 50. Consequently, the light source 12 is capable of being moved alone the glass panel 40 so as to illuminate light to pass through the document 50 placed thereunder, while the sliding carriage 14 is driven to move along the slide rod 20 The sliding carriage 14 is generally arranged with an AC to DC converter (not shown) and the light source 12 has a lamp electrically coupled to the AS to DC converter and a light-reflecting plate (not shown).

FIG. 2 is a partial perspective view of a conventional upper transparency adapter, in which only a slide rod 20 disposed at the center of the casing 100 is illustrated. As shown in the drawing, one end of the slide rod 20 is firmly secured to a support 26' attached to the inner surface of the casing 100, and the sliding carriage 14 slidably coupled to the slide rod 20 is joined to a driving belt 25. The driving belt 25 is wound around a pulley 23 proximate to the support 26' and driven by a servo motor (not shown) allowing the sliding carriage 14 to be driven by the driving belt 25 to slide along the slide rod 20.

Referring to FIG. 3, the slide rod 20 is firmly secured to the support 26' with bolts 29 which securely fix the support 26' to the posts 28' protruded from the inner surface of the casing 100. Due to the lack of manufacturing and assembling precision a gap G is usually formed between the light source 12 and the glass panel 40. As abovementioned, the sliding carriage 14 is movably coupled to the slide rod 20 and the light source 12 are radially outwardly extended toward the opposing sidewalls of the casing 150, so that when the driving belt 25 drives the optic source element 10 to slidably move along the slide rod 20, the light source 12 tends to swing or oscillate to thereby cause the light source 12 to irregularly come in touch with the glass panel 40. When the light source 12 irregularly comes in touch with the glass panel 40 during the moving course, noises will generate.

Furthermore, the swing or oscillation of the light source 12 during the scanning operation, not only generates the noise, but also adversely affects the scanning quality.

BRIEF SUMMARY OF THE INVENTION

Accordingly, the present invention has been designed for overcoming the shortcomings of the aforementioned conventional upper transparency adapter. The primary objective of the present invention is to provided a vibration-proof device that prevents the optic source element disposed in an upper transparency adapter of a scanner from swing or oscillating, thus eliminating noise when the scanner is in operation.

Another objective of the present invention is to provide a vibration-proof device that can prevent the optic source element disposed in an upper transparency adapter of a scanner from swinging or oscillating, thus assuring the scanning quality.

In accordance with the above and other objectives, the present invention provides a vibration-proof device for an optic source disposed in an upper transparency adapter of a scanner, wherein the upper transparency adapter is secured to a casing of the scanner, to allow the scanner to scan a transparent document. The upper transparency adapter is composed of a cover attached to the top of the scanner, the optic source element mounted in the cover, a glass panel installed on the bottom of the cover and a slide rod mounted in the cover to which the optic source element is coupled, allowing the optic source element to slidably move along the glide rod proximate to the glass panel.

The vibration-proof device of the present invention comprises a supporter for coupling the slide rod, a positioning member erected from a base of the cover toward the glass panel for retaining the supporter in place in the cover, and an elastic member interposed between the supporter and the base of the cover so as to resiliently support the supporter to thereby constantly abut the optic source element against the glass panel by an appropriate elastic force rendered by the elastic member.

At the end of the positioning member facing the glass panel is formed with an enlarged portion for preventing the supporter from escaping from the positioning member. Since a conventional bolt is generally in a shape of elongated post with a head having a diameter greater than that of the post, so it can serve as the positioning member for the purpose of reducing production and assembly costs. Furthermore, the positioning member may be directly screwed into the cover, or screwably engaged with an engaging post protruded from an inner surface of the cover facing the glass panel.

The elastic member may be a spring, an elastic cylindrical rod, or the like and is adapted for sleeving the positioning member or the engaging post for engagement with the positioning member.

The supporter is formed with at least a hole for the insertion of the positioning member, so it can be slidably retained in position along the axial direction of the positioning member and resiliently supported by the elastic member for constantly abut the optic source element coupled to the slide rod connected with the supporter against the glass panel.

BRIEF DESCRIPTION OF DRAWINGS

The present invention will be detailed in the following with the accompanying drawings.

DETAILED DESCRIPTION OF PREFERRED EMBODIMENT

Figure 1:
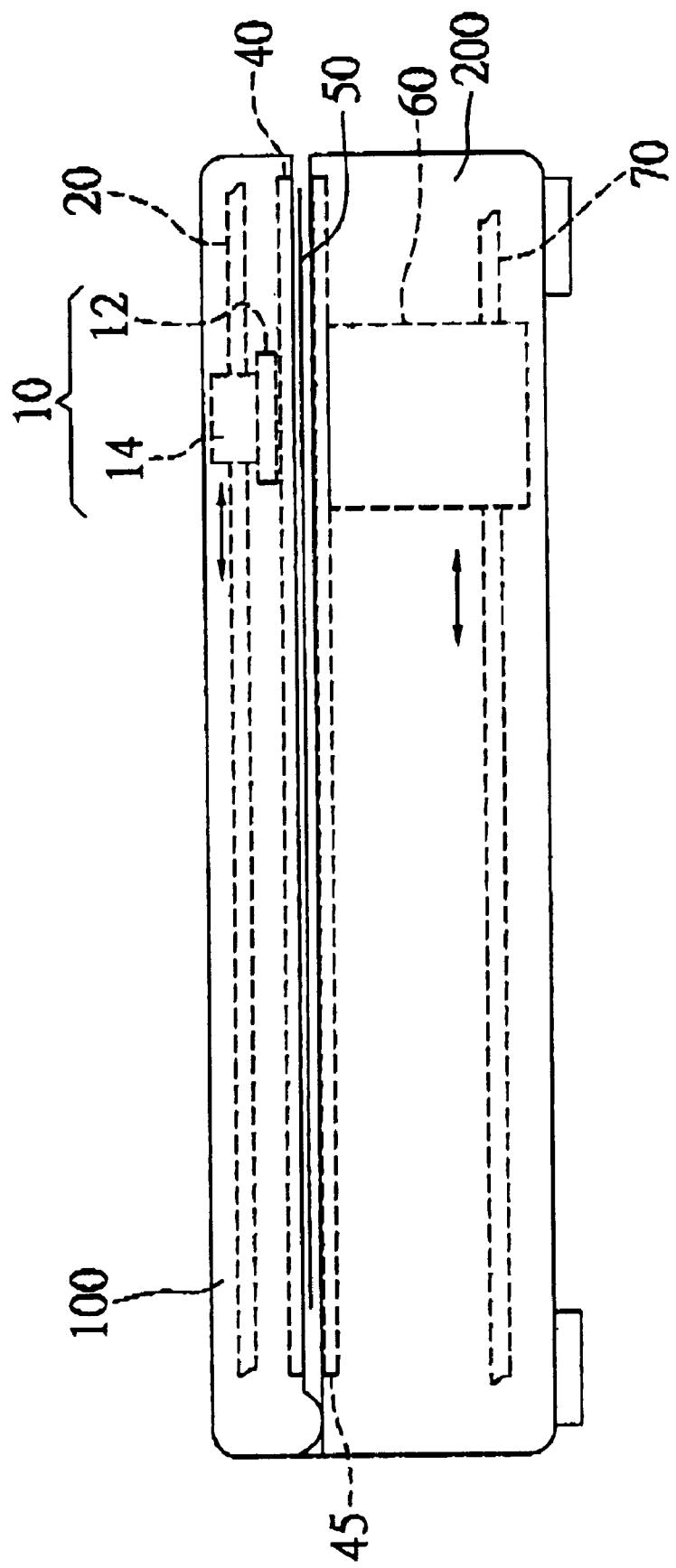
FIG. 1 is a lateral schematic view showing the construction of a prior art scanner equipped with an upper transparency adapter.
Figure 2:
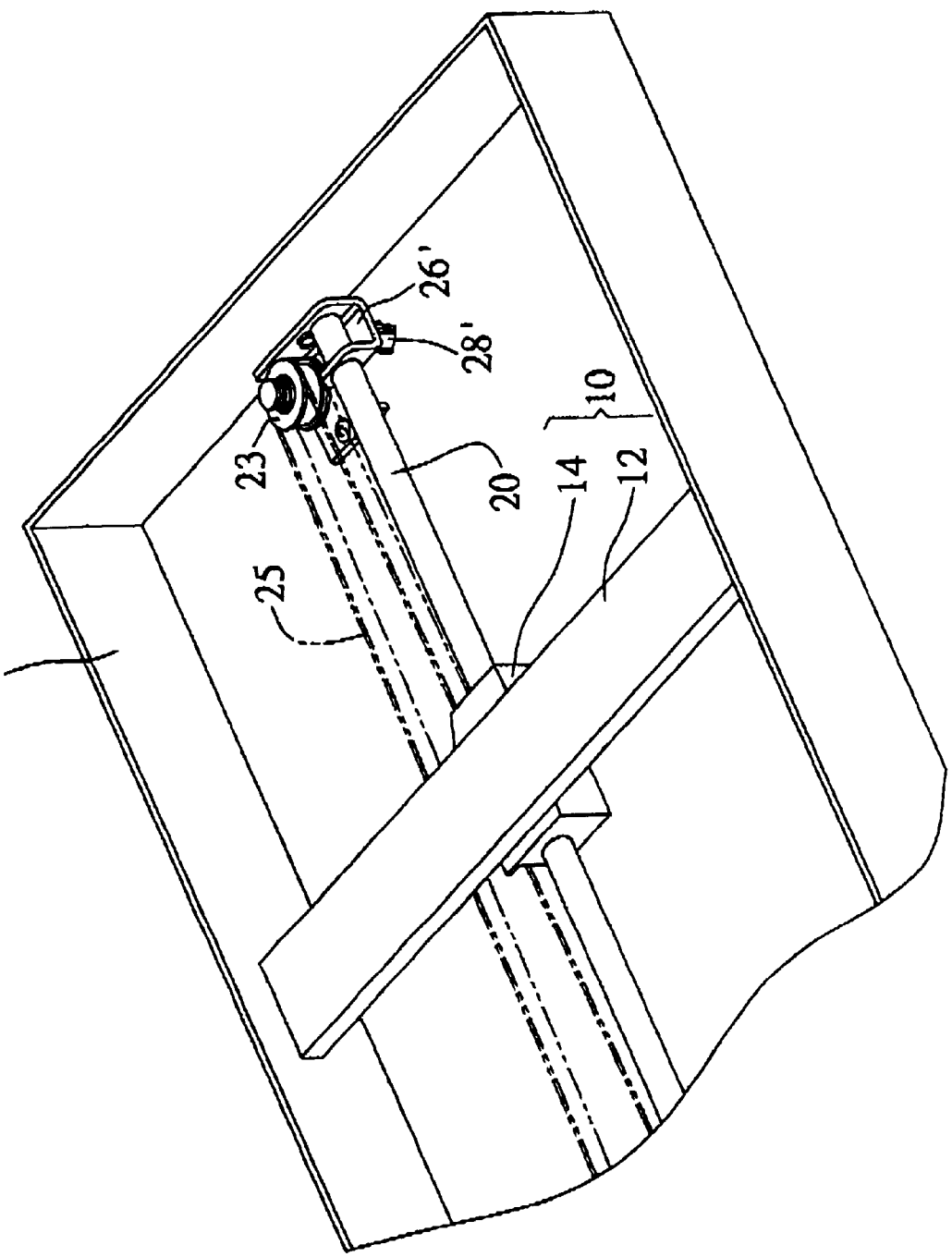
FIG. 2 a partial perspective view of a conventional upper transparency adapter.
Figure 3:
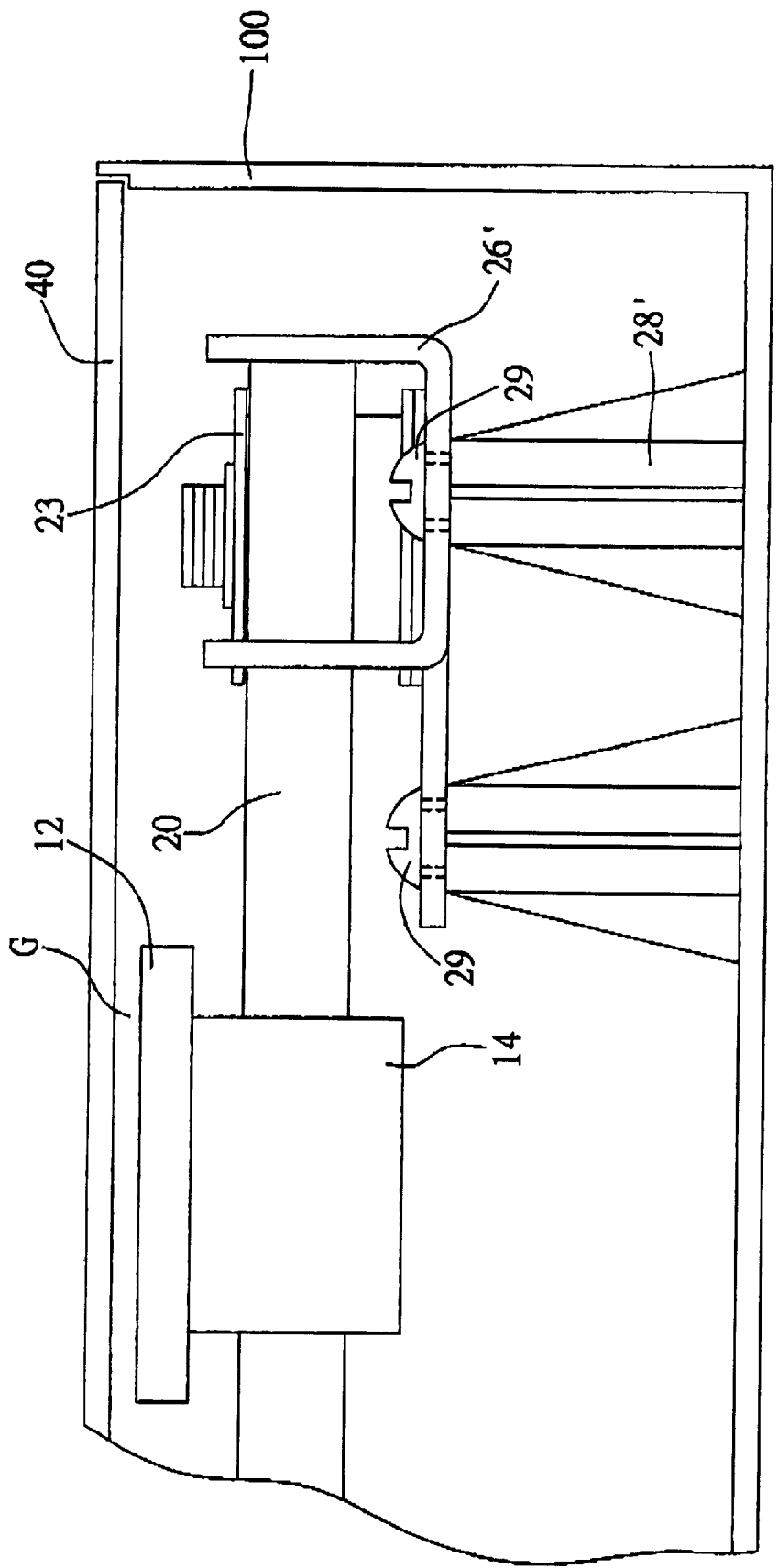
FIG. 3 is a partial perspective view of a slide lever fixing structure in a conventional upper transparency adapter.
Figure 4:
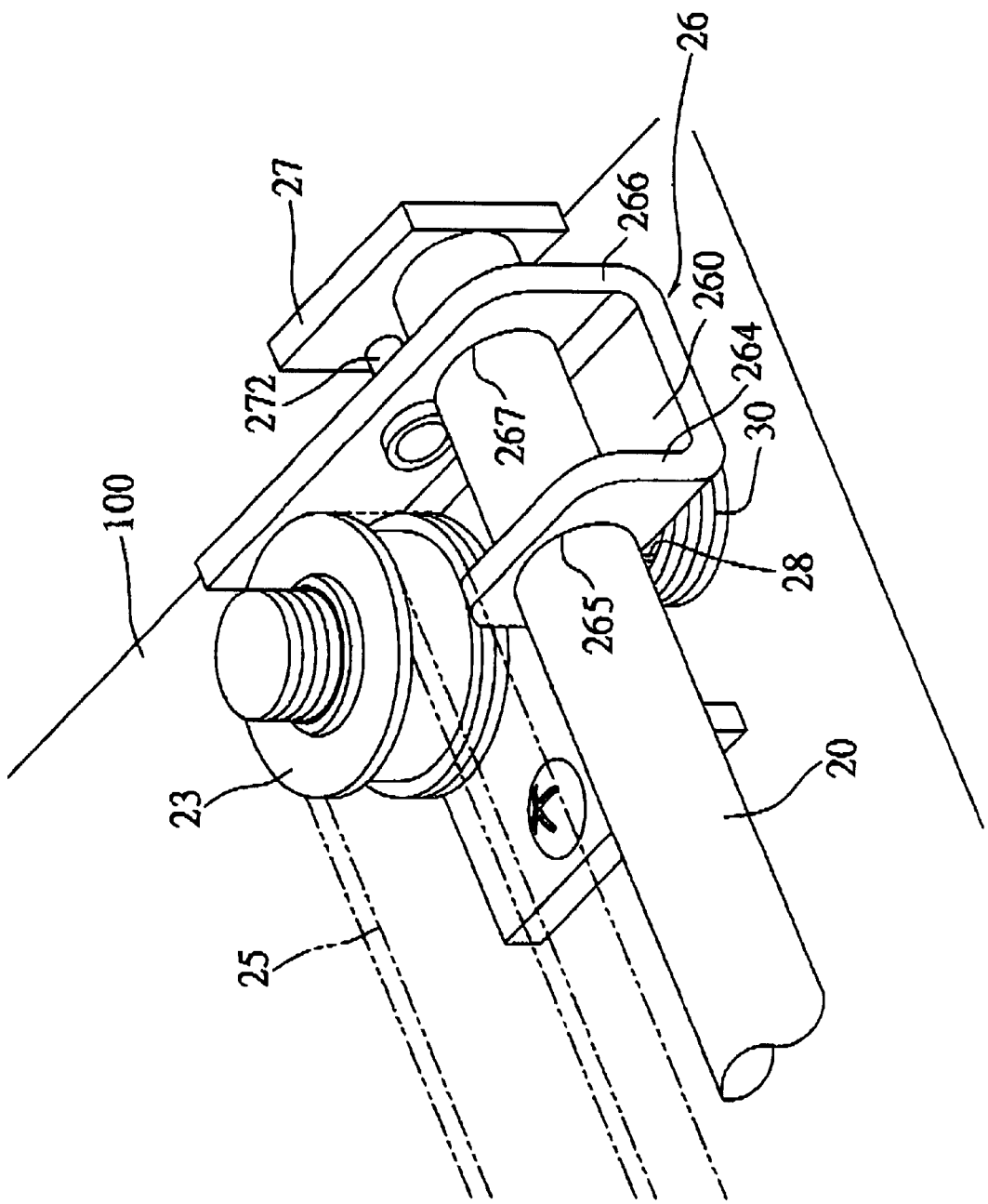
FIG. 4 is a schematic perspective view of vibration-proof device according to the present invention.
Figure 5:
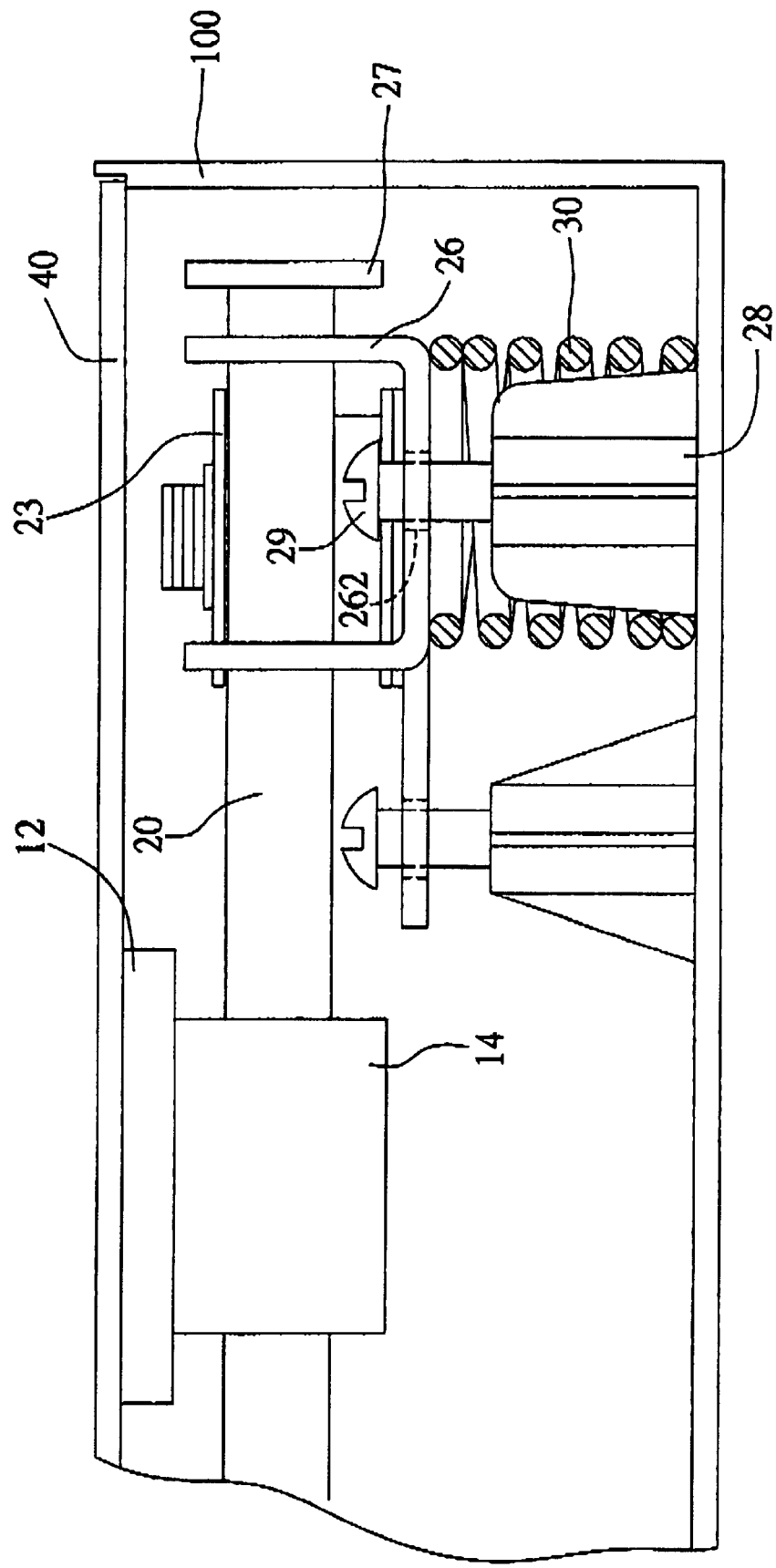
FIG. 5 is a lateral schematic view of vibration-proof device in the present invention.

Referring to FIGS. 4 and 5, the vibration-proof device according to the present invention comprises a bolt (positioning member) 29 screwed in the inner surface of a cover 100, a plate support (supporter) 26 movably secured to the bolt 29, and a spring (elastic member) 30 interposed between the plate support 26 and the cover 100.

As shown in the drawing, a engaging post 28 is protruded from an inner surface of the cover 100, and a part of the bolt 29 is screwed into the engaging post 28. The plate support 26 has a bottom plate 260 parallel to a glass panel 40, and two walls 264, 266 vertically folded upwards from the sides of the bottom plate 260. The bottom plate 260 is formed with a hole 262 for the insertion of the bolt 29, as shown in FIG. 5. The diameter of the hole 262 is larger than the that of the bolt, so that the plate support 26 can be slidably retained in position along the axial direction of the bolt 29, while the larger diameter head (enlarged portion) at the front end of the bolt 29 can prevent the plate support 26 from escaping from the bolt 29.

The walls 264 and 266 are formed with holes 265 and 267 for the insertion of a slide rod 20, respectively, as shown in FIG. 4. The distal end of the slide rod 20 passing through the holes 265 and 267 is provided with a plate 27. The plate 27 is joined to the wall 266 of the plate support 26 by a rivet 272 for preventing the slide rod 20 from rotation and moving axially.

As shown in FIG. 5, the spring 30 sleeves the bolt 29 and the engaging post 28 to be interposed between the cover 100 and the bottom plate 262 of the plate support 26. A sliding carriage 14 movably installed on the slide rod 20 is designed so that the surface of a light source 12 on the sliding carriage 14 is slightly higher than the surface where the glass panel 40 is mounted. Therefore, when the glass panel 40 is mounted on the cover 100, the glass panel 40 will somewhat press down on the light source 12. Due to such arrangement, the force depressing on the light source 12 will be transmitted through the sliding carriage 14 and the slide rod 20 so as to press the plate support 26 downwards, and then the spring 30 is compressed. As a result, the compressed spring 30 will resilient back on the plate support and the slide rod 20 so as to constantly abut the light source 12 against the glass panel 40.

As shown in FIGS. 4 and 5, a pulley wound by a driving belt 25 to drive the sliding carriage 14 is also mounted on the bottom plate 262 of the plate support 26, so that the buffer effect of the spring 30 will minimize possible vibration caused by the driving belt.

Therefore, comparing with the conventional technology, the present invention utilizes the resiliency of the compressing spring 30 to push the plate support 26 and the slide rod 20 toward the glass panel 40 to constantly abut the light source 12 against the glass panel 40, thus minimizing the gap between the light source 12 and the glass panel 40, and preventing possible noise caused by the light source 12 flapping on the glass panel 40.

Furthermore, since no gap occurs between the light source 12 and the glass panel 40, the light source 12 will not swing or oscillate, and therefore, the light emitted from the light source 12 is stable to ensure the quality of scanning instead of resulting cross textures on the scanned image due to vibration in scanning.

The above description covers merely the preferred embodiment of the present invention, so any equivalent variations or modifications deriving from the spirit and approach shall be included in the scope of the subject claims.

What is claimed is:

1. A vibration-proof device for an optic source element mounted in an upper transparency adapter of a scanner for performing a transmission, said upper transparency adapter including a cover attached to a top of said scanner, said optic source element, a glass panel attached to a bottom of said cover, and a slide rod mounted in said cover to which said optic source element is slidably coupled, said vibration-proof device comprising:

a supporter for coupling said slide rod in said cover;

a positioning member erected form a base of said cover toward said glass panel for retaining said supporter in place in said cover; and an elastic member interposed between said supporter and said base of said cover so as to resiliently support said supporter toward said glass panel, to thereby constantly abut said optic source element against said glass panel by an appropriate elastic force rendered by said elastic member.

2. The vibration-proof device of claim 1, wherein said positioning member is an elongated post formed with an enlarged portion for preventing said supporter from escaping from said positioning member.

3. The vibration-proof device of claim 1, wherein said positioning member is directly screwed to said base of said cover.

4. The vibration-proof device of claim 3, wherein an engaging post is protruded from said base of said cover for screwably engaging with said positioning member.

5. The vibration-proof device of claim 1, wherein said supporter is formed with at least a hole for the insertion of said positioning member so as to allow said supporter to be slidably retained in position along an axial direction of said positioning member.

6. The vibration-proof device of claim 5, wherein said elastic member is a spring.

7. The vibration-proof device of claim 1, wherein said elastic member is an elastic cylindrical rod.

* * * * *